United States Patent [19]
Brown

[11] Patent Number: 5,977,981
[45] Date of Patent: *Nov. 2, 1999

[54] SOFTSTROKING OF EDGES FOR COMPUTER GRAPHICS

[75] Inventor: Craig Matthew Brown, West Pennant Hills, Australia

[73] Assignees: Canon Information Systems Research Australia Pty Ltd., New South Wales, Australia; Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,813

[22] Filed: Dec. 11, 1996

Related U.S. Application Data

[63] Continuation of application No. 08/207,078, Mar. 8, 1994, abandoned.

[30] Foreign Application Priority Data

Mar. 8, 1993 [AU] Australia .................................. PL7678

[51] Int. Cl.$^6$ .................................................. G06T 11/00
[52] U.S. Cl. ........................................... 345/429; 345/441
[58] Field of Search ..................... 395/129–133, 395/141–143; 345/429–433, 441–443

[56] References Cited

U.S. PATENT DOCUMENTS

| | | | |
|---|---|---|---|
| 5,339,386 | 8/1994 | Sodenberg et al. ..................... | 395/122 |
| 5,347,620 | 9/1994 | Zimmer ................................... | 395/129 |
| 5,425,137 | 6/1995 | Mohan et al. ........................... | 395/133 |
| 5,467,443 | 11/1995 | Johnson et al. ......................... | 395/133 |
| 5,469,536 | 11/1995 | Blank ....................................... | 395/131 |
| 5,611,036 | 3/1997 | Berend et al. ........................... | 395/141 |

FOREIGN PATENT DOCUMENTS 2157122  10/1985  United Kingdom .

OTHER PUBLICATIONS

"Compositing Digital Images", Thomas Porter and Tom Duff, Computer Graphics, vol. 18, No. 3, Jul. 1984, pp. 253–259.

"Merging and Transformation of Raster Images For Cartoon Animation", Bruce A. Wallace, Computer Graphics, vol. 15, No. 3, Aug. 1981, pp. 253–262.

"Anti–Aliased Line Drawing Using Brush Extrusion", Turner Whitted, Computer Graphics, vol. 17, No. 3, Jul. 1983 at pp. 151–156.

*Primary Examiner*—Joseph H Feild
*Attorney, Agent, or Firm*—Fitzpatrick, Cella, Harper & Scinto

[57] ABSTRACT

A method for rendering or compositing image components, where at least one of the image components has an edge. The edge is rendered or composited a plurality of times, the repetitions being performed with different values of the edge thickness (i.e., the thickness of the line) and with different opacities. This makes it possible to create in this way an opacity gradient or the like, so that the edge may be given a softer and less abrupt appearance, if such is desired.

31 Claims, 6 Drawing Sheets

SOFTSTROKING OF EDGES FOR COMPUTER GRAPHICS

This application is a continuation, of Application No. 08/207,078 filed Mar. 8, 1994, now abandoned.

The present invention relates to the art of computer generated images and in particular, to the merging multiple images through composition or rendering.

BACKGROUND OF THE INVENTION

A number of standard computer systems are available for the production of 'computer graphics' whereby images are generated entirely electronically. These often take the form of a computer attached to a raster graphics display or other raster output device, and an input device through which the operator can draw and see the results of his work in real time on the electronic display. In using such devices, it is possible to create images of almost arbitrary complexity.

For the purposes of illustration it can be assumed that each image is made up, at the most primitive level of a large number of individual pixels each of whose colour can be easily altered, and the display of an image is achieved by display of the individual pixels on a computer display device.

In one popular format for storing colour images (known as an RGBO format) the red, green and blue (RGB) information is stored in addition to an opacity value O being stored which relates to the degree of transparency (or Opacity) that particular image has at that particular pixel. The separate storage of the opacity value is known as an 'Opacity Plane' or 'alpha channel'. It can be assumed to the purposes of discussion of the present invention that the opacity information is stored separately as an opacity plane. This method of storage is especially convenient when multiple images are to be 'composited' over one another and transparency effects are to be used in the final composite colour image. A full discussion of the procedure used in compositing images through the use of an opacity plane is disclosed in 'Compositing Digital Images' by Thomas Porter and Tom Duff, published in Computer Graphics, Volume 18, Number 3, July 1984, at page 253.

The process of compositing, as outlined in the above mentioned article, involves combining portions of one value with portions of another value, whilst the process of rendering involves the replacement of one value by another, and both are applicable to the prior art and the present invention.

Referring now to FIG. 1 there is shown an image of a hollow triangle 2 in front of a solid square 6. In this example, the triangle 2 is defined by three points 3,4 and 5. Hence the display of the triangle 2 can be achieved by drawing a line between each of these points (or by altering pixels that lie in a line between the points). In order to achieve an edge of greater thickness, it is necessary to draw both the line itself as well as pixels that are adjacent to the line itself. Methods of drawing thick lines are known to those skilled in the art.

Although the types of pictures drawn using such techniques can be of very high quality they do not fall into the catergory of 'fine art' and the degree of realism that is achievable is limited. This is caused by the nature of the 'hard lines' that are created by such a technique, being substantially different from the possible textures and tonal qualities that a graphic artist would produce using more conventional tools.

It is desirable to produce a final picture with the appearance to the observer that, for example, the foreground triangle 2 is properly blended with the background square 6.

One desirable effect to achieve for the proper blending of objects is to have a central portion of an edge 7 having a high opacity value with a gradual decreasing opacity to the exterior portion of an edge 8 which has a low opacity value and is therefore highly transparent.

Referring now to FIG. 2 there is shown an opacity cross section along the line A—A of FIG. 1, showing a first method used in construction of the opacity edge of the triangle in FIG. 1. One desired method of preparation of such opaque values is to define the opaque values proceeding in a linear ramp from a maximum value. One method of doing this would be to create an opacity plane for the triangle 2 with a high opacity (close to value 1) at those pixels close to the central portion of an edge 7, and a low opacity (close to the value 0) at the exterior portion of an edge 8 with the opacity mask decreasing at right angles to the direction of the edge.

However, this method is particularly complicated, especially where the image being rendered has a substantial number of complicated opacity profiles for each edge that must be composited. Referring now to FIG. 3 there is shown a complicated edge profile to be composited up on a square 11. In this example, an edge 10, which is to be composited on the rectangle 11, has a number of jaggered portions 12. It is not readily apparent what the exact form of the opacity mask should be in compositing such an edge as the use of a linear ramp opacity mask at right angles to the direction of the edge does not work at comer edges that do not have a normal to it.

One form of describing computer graphical images, in common use in the art, is to described the image by means of a page description language (PDL). PDL's have become very popular in recent times as they allow more flexibility in the use on a multitude of different output devices in that the description of a particular image is provided on a device independent basis. PDL's normally provide for extensive support for curves and curve thickness which form common parts of computer images. However, if the above methods are used to determine an opacity profile then a pixel by pixel description of the opacity plane of the image must be stored as it is not readily apparent how the picture can be created from a curve based description. This is particularly inconvenient if multiple graphical images are desired to be stored in a computer system due to the resultant increase in image storage space.

SUMMARY OF THE INVENTION

It is an object of the present invention to provide an alternative method of rendering images so as to provide for the blending of images together.

In accordance with one aspect of the present invention, there is provided a method of method of creating an images having plural image components, where at least one of the image components has an edge. According to this aspect of the invention, the edge is rendered or composited a plurality of times, the repetitions being performed with different values of the edge thickness (i.e., the thickness of the line) and with different opacities. This makes it possible to create in this way an opacity gradient or the like, so that the edge may be given a softer and less abrupt appearance, if such is desired. Certain details of the process can be varied, for example, the use of rendering versus compositing, and the relation between thickness value and opacity, which may for example be either direct or inverse.

BRIEF DESCRIPTION OF THE DRAWINGS

A number of preferred embodiments of the present invention will now be described with reference to the accompanying drawings in which.

BEST AND OTHER MODES OF PERFORMING THE INVENTION

Figure 1:
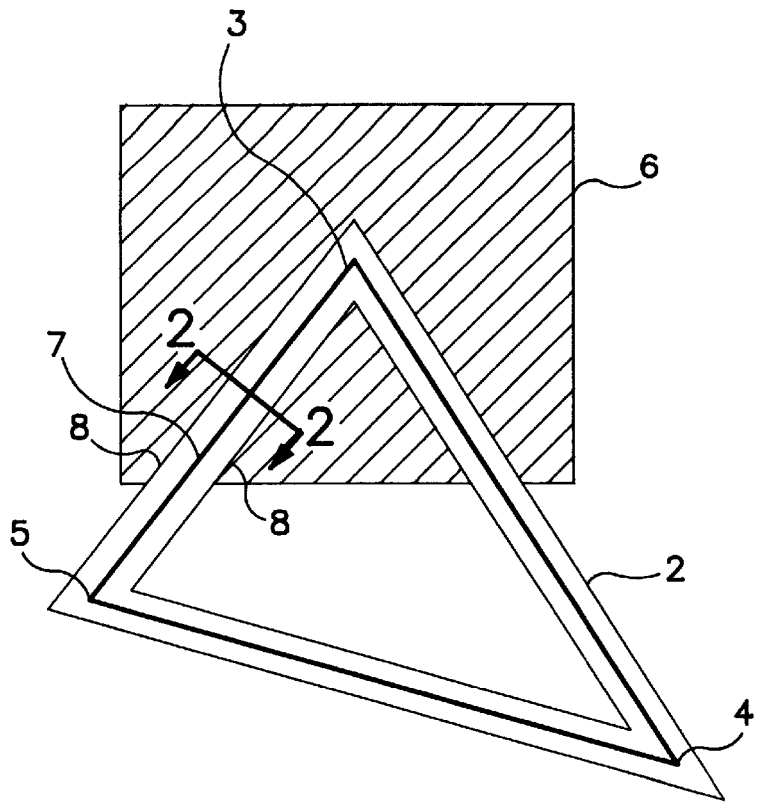
FIG. 1 illustrates a picture of a sample triangle in front of a square.
Figure 2:
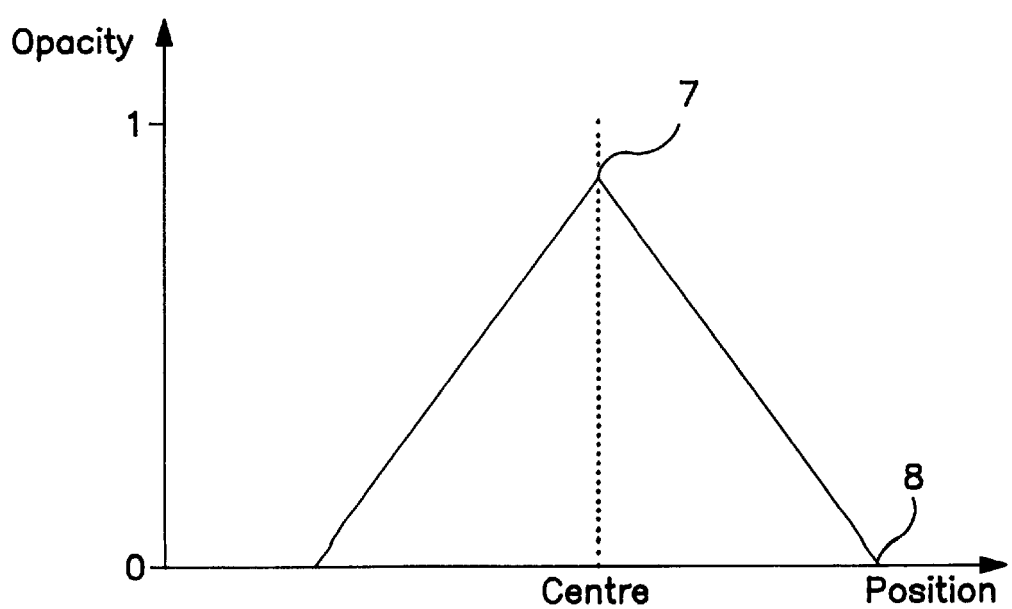
FIG. 2 illustrates an opacity cross section through the edge A—A of the triangle of FIG. 1, showing a first method used in construction of the opacity edge of the triangle in FIG. 1.
Figure 3:
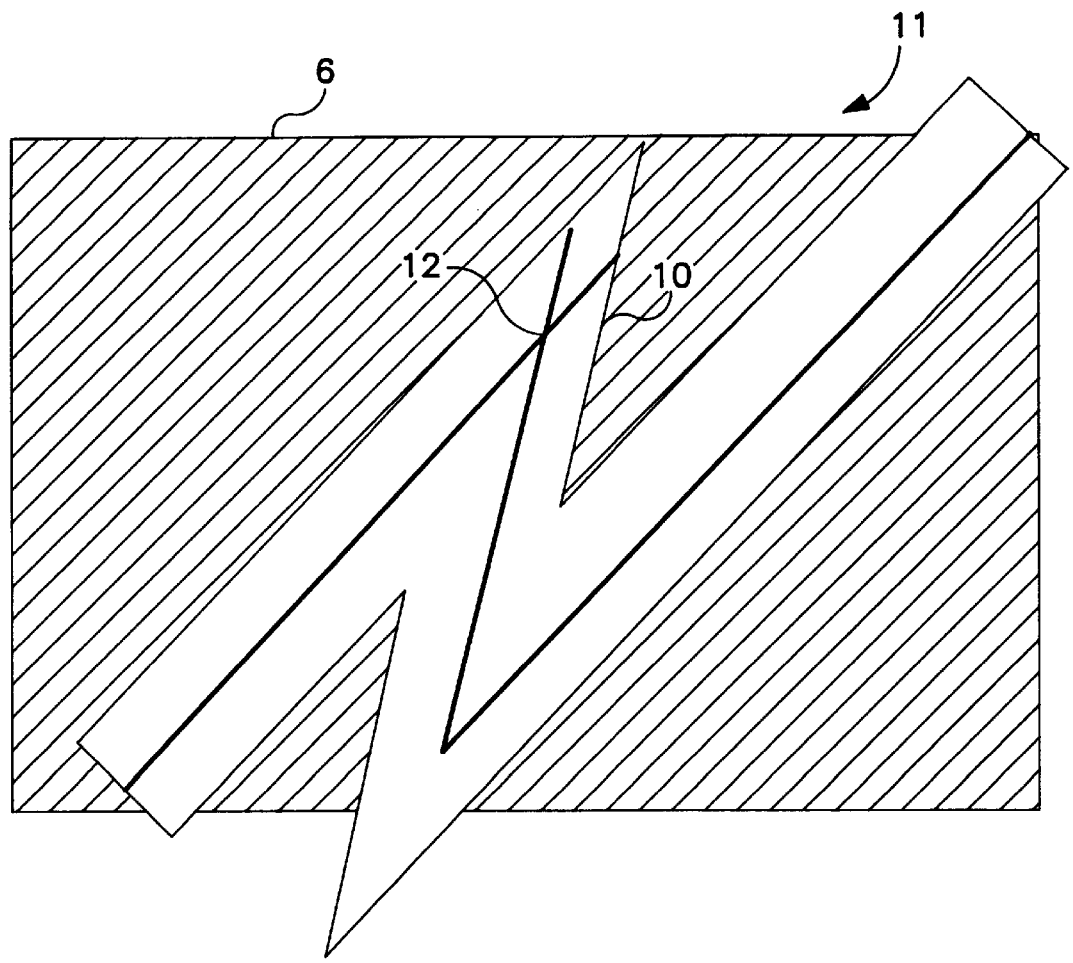
FIG. 3 illustrates a complicated edge profile to be composited on a square.

In order to simulate the affect of blending of an image, an opacity profile approximating that of FIG. 2 of the edges of the image is generated. This is done by 'stroking' the edges of an image multiple times with increased stroke widths and different opacity measures. The opacity values can be built up in a number of ways. Firstly, the values can be rendered to the opacity plane. Alternatively, they can be composited to the opacity plane.

Figure 4:
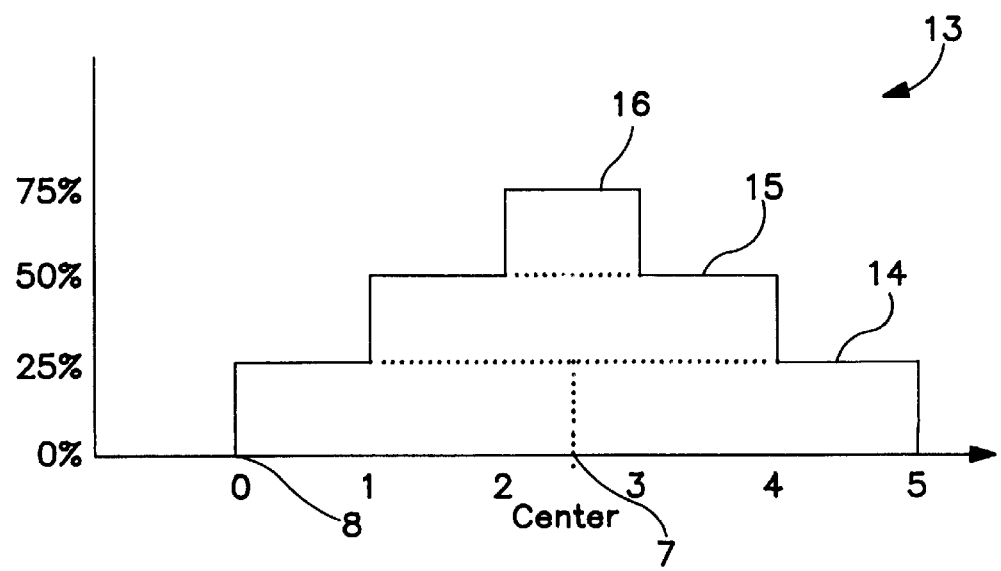
FIG. 4 illustrates an example opacity profile of an edge five pixels wide as determined by one embodiment of the present invention.

Referring now to FIG. 4 there is shown an example opacity profile 13 of an edge five pixels wide as determined by one embodiment of the present invention. In a first method of rendering to the opacity plane, the opacity profile 13 is built up by rendering strokes or edges of increasing opacity and decreasing thickness. In this process, the opacity profile of the edges of an object is generated by first determining the pixel distance from the central portion of an edge 7 to the exterior portion of an edge 8. This distance is used to define a number of different monotonically increasing opacity levels, each preferably one pixel wide. For example, in FIG. 4, this profile is built up by rendering a wide edge which is five pixels wide having a bottom level opacity 14, preferably around 25%. The same edge of an object is then rendered three pixels wide having a middle level opacity 15 of 50% followed by a single pixel wide rendering at the top level opacity 16 having an opacity of 75%.

As another example, to stroke an object edge with a 3 millimetre stroke width, it is first necessary to decide the number of stroke widths that are required. This can be calculated by first determining the type of output device. High quality laser colour copiers such as the Canon CLC-500 copier operate at approximately 400 dots per inch (400 dpi). This is equivalent to about 15.75 dots per millimetre. Therefore a 3 millimetre edge is likely to comprise about 47.25 dots across its width when printed out using the copier device.

One form of stroking which gives satisfactory results is to decrease the size of the stroke by one pixel each iteration. Therefore the above calculation would require approximately 24 strokes (47.25/2) with each stroke decreasing in size from the previous stroke by about 1 pixel width.

This form of 'softstoking' of the edges of an image is particularly convenient when a description of the image is in the form of a PDL as the same image is rendered multiple times with the only alterations being in the thickness and opacity of the edges. Hence the opacity profile can be constructed from the iteration of a portion of a PDL describing the edges of the image, with different edge thickness and opacity settings.

In a second method of building up the opacity profile, the image is built up by a compositing process. In the compositing process as outlined in the above mentioned article, the existing values for a pixel are used in combination with a compositing value in the image, The normal compositing equation can be used, being:

$$\text{New Destination} = \text{source} + \text{destination} - (\text{source} * \text{destination}) \quad \text{(EQ 1)}$$

When the stroking is composited over a previous image it is required that there is approximated a steadily increasing compositing ratio from fully transparent at the edge (opacity=0), to filly opaque at the centre of the image (opacity=1). For example, a line five pixels wide would also be required to have a final opacity cross section as depicted in FIG. 4 containing the central line approaching a limit of 100% opacity. This is formed by creating a line of one pixel width with an opacity of 75% followed with one with opacity 50% and one with opacity 25%.

Preferably the smaller central stroke is composited first. followed by the next smallest stroke and so on. Therefore, through working backwards, a series of equations as indicated below can be produced.

Also, the last, largest stroke needs to be composited 25%. and the second largest needs to be composited 50%. Therefore, it is required to determine what we require to composite 25% onto to get 50%. Using Equation 1 this results in.

$$0.50 = 0.25 + \text{destination} - 0.25 * \text{destination} \quad \text{(EQ 2)}$$

$$\text{i.e.: } 0.25 = 0.75 * \text{destination} \quad \text{(EQ 3)}$$

$$\text{destination} = 0.33 \text{ or } 33\% \quad \text{(EQ 4)}$$

Similarly to obtain the 75% also using equation 1:

$$0.75 = 0.25 + \text{destinationl} - 0.25 * \text{destinationl} \quad \text{(EQ 5)}$$

$$\text{destinationl} = 0.66 \quad \text{(EQ 6)}$$

$$0.66 = 0.33 + \text{destination} - 0.33\text{destination} \quad \text{(EQ 7)}$$

$$0.33 = 0.66 * \text{destination} \quad \text{(EQ 8)}$$

$$\text{destination } 0.5 \quad \text{(EQ 9)}$$

Therefore. instead of rendering 25%, 50% and 75% in decreasing sized strokes, it is possible to achieve the same results by comrpositing 50%, 33% and 25% in larger or increasing sized strokes.

Generalizing the above mentioned process, it can be seen that the opacity to use and each stage can be determined from the equation:

$$\text{opacity to use} = \frac{\text{opacity interval}}{1 - (\text{opacity interval} - 1)} \quad \text{(EQ 10)}$$

When displaying the effect of soft stroking on a computer display, the need for a rapid update to the display is crucial, whereas the printing of images by a printing device generally takes longer and hence an increased number of strokes can be used. Therefore, preferably when displaying on a computer display, a reduced number of strokes is used so as to ensure higher speed operation, with the consequential side effect that when an image is zoomed in upon, the result of softstroking may appear to be somewhat 'jaggered'.

The use of the process of softstroking is particularly advantageous in the creation of a final image from portions of multiple independent images wherein each picture is made up of purely pixel information. A simple example of the use of the softstroking method in image composition will now be described with reference to FIG. 5 to FIG. 11.

Figure 5:
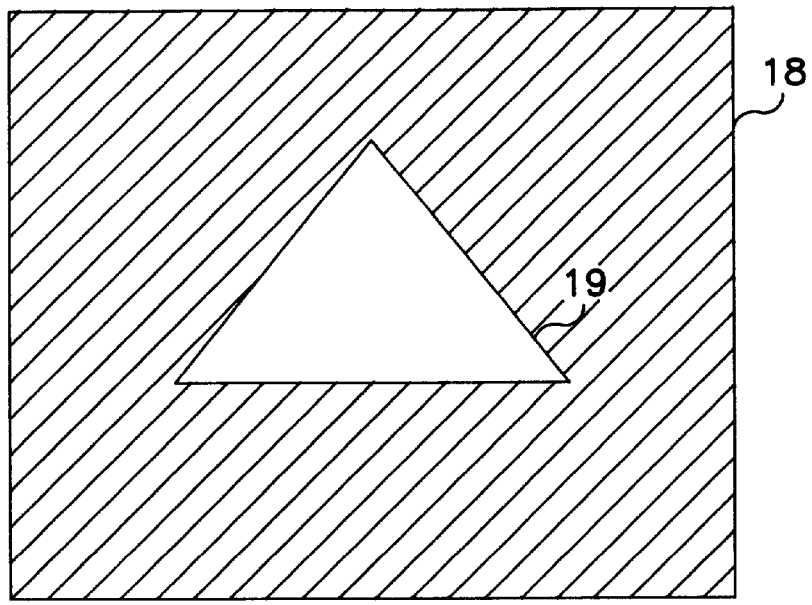
FIG. 5 illustrates a sample original image consisting of pixel based information of a triangle within a square.
Figure 6:
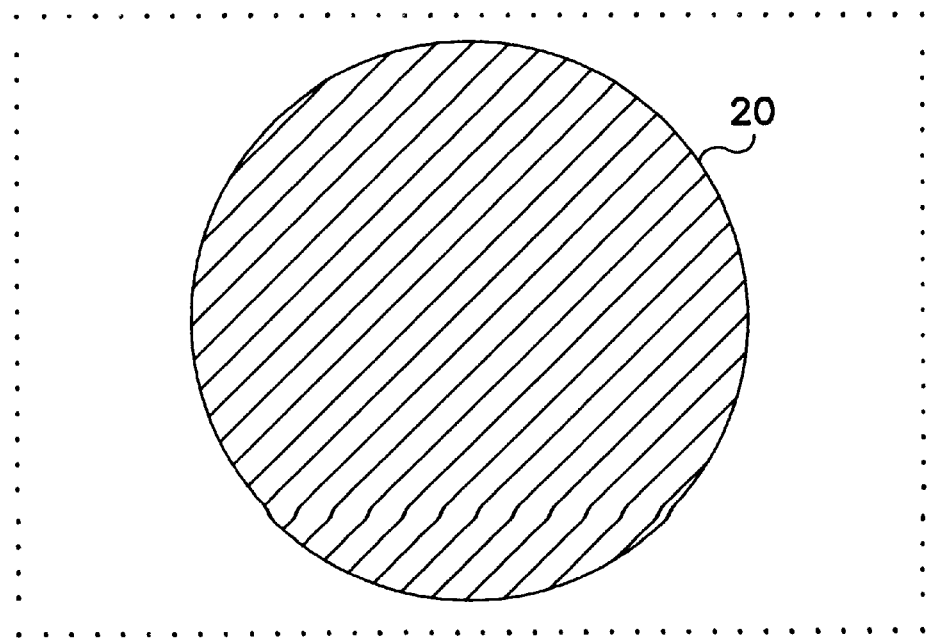
FIG. 6 illustrates a pixel based image of a circle forming the portion of the image onto which it is desired to composite onto.

Referring now to FIG. 5 there is shown a sample original image consisting of pixel based information, as opposed to object based information, of a triangle 19 within a square 18. By way of example, it is desired to 'cut out' that portion of the image comprising the triangle 19 and composite it onto a different background such as that shown in FIG. 6 which comprises a pixel based image of a circle 20.

Firstly the portion of the image comprising the triangle 19 is traced over using known techniques resulting in edge information data 31 which is used to describe the pixels within an edge of the triangle 21.

Figure 7:
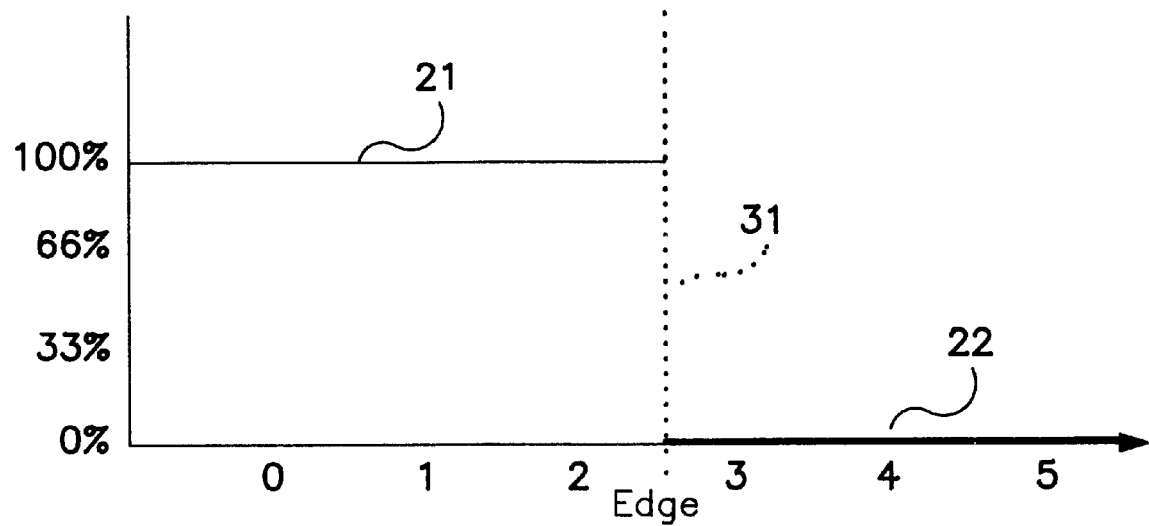
FIG. 7 illustrates an opacity mask of the prior art method.

Referring now to FIG. 7 there is shown an opacity mask of the prior art method. In prior art techniques an opacity mask could then be created for extracting the triangle 19 from the rest of the image with an opacity value 21 of 100% for those pixels within an edge of the triangle 19 and an opacity value 22 of 0% or transparent values for those pixels outside an edge of the triangle 19.

Figure 8:
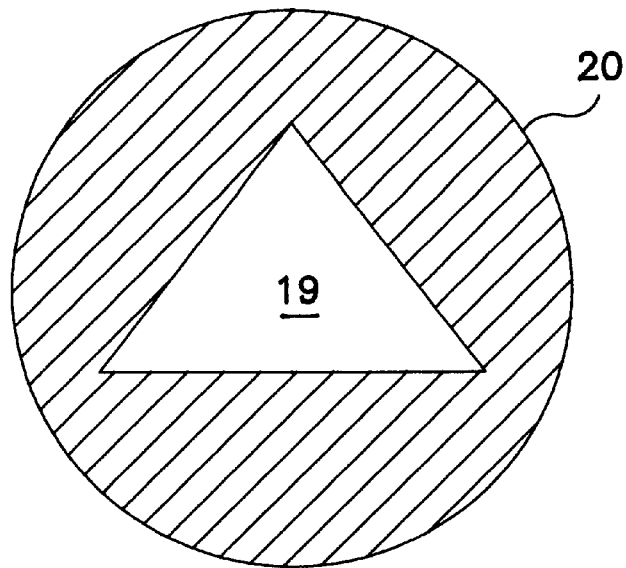
FIG. 8 illustrates the final composited image or a triangle within a circle containing a different hatching pattern.

When the image of the triangle is ready to be composited over another image, say a circle, using the newly created opacity mask, the resulting image after compositing will be similar to that shown in FIG. 8, with the traced edges of the triangle 19 forming a 'hard edge' often noticeable to the observer.

Figure 9:
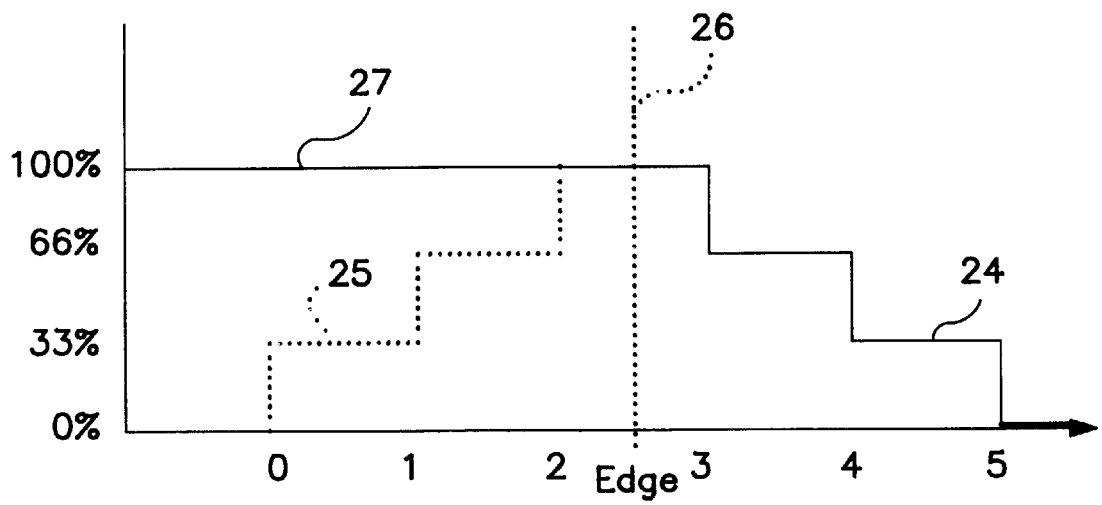
FIG. 9 illustrates a first method for building up an opacity mask using softstroking methods.

Referring now to FIG. 9 there is shown a first method for building up an opacity mask using softstroking methods. In this method, the edge of the triangle is firstly softstroked as outlined above to produce the normal softstroking opacity profile 24, 25. The edge information 26 of the triangle is then used to perform a fill 27 of those pixels within the edges of the object with an opacity set to 100%. This can be created by rendering 100% opacity values to pixels inside the edges of the image or by compositing the fill pattern on the opacity mask either after the softstroking.

When the resulting opacity mask profile is used as a mask to composite the image of FIG. 5 to create an image similar to that shown in FIG. 8, the edges of the traced out triangle are blended with the background image. This results in an image whereby a predetermined number of pixels outside the traced out edges of the triangle (or traced object) are also composited on the final image. This is often an undesirable effect, especially when the edge of the traced out image delineates a marked change in the image content, as portions of the changed image will be incorporated in the final image.

Figure 10:
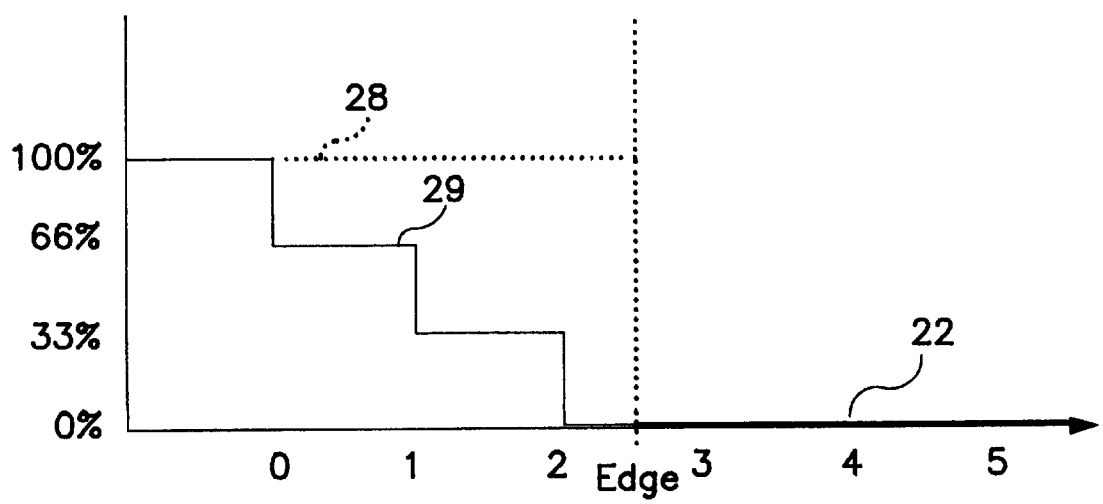
FIG. 10 illustrates a second method for building up an opacity mask using softstroking methods.
Figure 11:
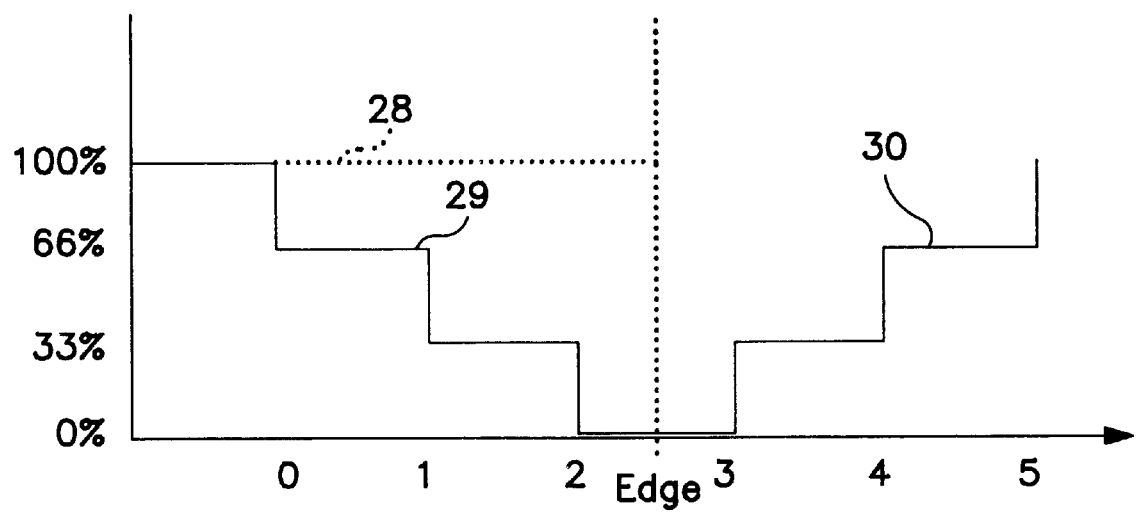
FIG. 11 illustrates the softstroking opacity mask used in constuction of the opacity mask of FIG. 9.

Referring now to FIG. 10 and FIG. 11 there is shown a second method of forming an opacity mask which often produces superior results to the first method of producing opacity masks for objects and their edges. As can be seen from the opacity profile of an edge as depicted in FIG. 11, this is due to the fact that the opacity of the object is gradually reduced as the edge of the object is approached from the inside of an object. Hence this overcomes the problem of the previous method as no pixels outside the traced out edge of an object will be composited with the object when it is composited with another image.

One method of creating such a profile is to first start with an opacity profile as shown in FIG. 7, portions of which are shown in dotted line 28. Soft stroking is then used to build the desired opacity profile 29 as pixels approach the edge of the image. The desired edge is mostly easily built by rendering the image with decreasing opacity settings with decreasing line widths thereby producing the opposite opacity profile to that shown in FIG. 11.

Unfortunately this method of softstroking also results in an unwanted opacity profile portion 30. However this opacity profile is easily removed by the process of 'clipping' against the edges of the object. The process of clipping is known to those skilled in the art and results in the discarding of those values of opacity outside the given edges of an object and hence the opacity values for non-object pixels can be altered to zero, thereby producing the opacity profile as shown in FIG. 10.

As stated previously, when compositing objects using the opacity mask with edges of the form of FIG. 10 the result is often superior to those produced using the profile as shown in FIG. 9.

The foregoing describes only a few embodiments of the present invention, and modifications, obvious to those skilled in the art, can be made thereto without departing from the scope of the present invention.

I claim:

1. A method of softstroking at least one component of an image to render said component including at least one edge having an opacity value and a thickness value, said method comprising the steps of:

compositing or rendering the at least one edge with a corresponding thickness value and a corresponding opacity value; and repeating said compositing or rendering step at least once with a thickness value and a corresponding opacity value each different from a preceding corresponding thickness value and opacity value, wherein said repeated compositing or rendering is carried out overlapping the previously rendered or composited edge so as to achieve softstroking of said at least one component.

2. A method as claimed in claim 1 wherein the thickness value has a range from a first, wide value to a second, narrow value, and the corresponding opacity value has a range from a first, low value to a second, high value.

3. A method as claimed in claim 1 wherein the thickness value has a range from a first, wide value to a second, narrow value, and the corresponding opacity value has a range from a first, high value to a second, low value.

4. A method as claimed in claim 1 wherein a center of said edge corresponds with a narrow thickness value.

5. A method as claimed in claim 1 wherein said opacity value is rendered to an opacity plane of said image.

6. A method as claimed in claim 1 wherein said opacity value is composited onto an opacity plane of said image.

7. A method of softstroking at least one component of an image to render said image, said component including at least one edge having an opacity value and a thickness value,s aid method comprising the step of:

compositing said edge with a first preselected edge thickness value and a corresponding first preselected opacity value; and repeating said compositing step a plurality of times using a progressively narrower thickness value and corresponding opacity value, wherein said repeated compositing is carried out overlapping the previously composited edge so as to achieve softstroking of said at least one component.

8. A method as claimed in claim 7 wherein for said repeating step, the opacity value is higher than the immediately preceding opacity value.

9. A method as claimed in claim 7 wherein for said repeating step, the opacity value is lower than the immediately preceding opacity value.

10. An apparatus for softstroking at least one component of an image to render said image, said component including at least one edge having an opacity value and a thickness value, said apparatus comprising:

means for compositing or rendering the at least one edge with a corresponding thickness value and a corresponding opacity value; and means for repeating said compositing or rendering step at least once with a thickness value and a corresponding opacity value each different from a preceding corresponding thickness value and opacity value, wherein said repeated compositing or rendering is carried out overlapping the previously rendered or composited edge so as to achieve softstroking of said at least one component.

11. The apparatus as claimed in claim 10 wherein the thickness value has a range from a first, wide value, to a second, narrow value, and the corresponding opacity value has a range from a first, low value, to a second, high value.

12. The apparatus as claimed in claim 10 wherein the thickness value has a range from a first, wide value, to a second, narrow value, and the corresponding opacity value has a range from a first, high value, to a second, low value.

13. The apparatus as claimed in claim 10 wherein a center of said edge corresponds with a narrow thickness value.

14. The apparatus as claimed in claim 10 wherein said opacity value is rendered to an opacity plane of said image.

15. The apparatus as claimed in claim 10 wherein said opacity value is composited onto an opacity plane of said image.

16. An apparatus for softstroking at least one component of an image to render said image, said component including at least one edge having an opacity value and a thickness value, said apparatus comprising:

means for compositing said edge with a first preselected edge thickness value and a corresponding first preselected opacity value; and means for repeating said compositing step a plurality of times using a progressively narrower thickness value and corresponding opacity value, wherein said repeated compositing is carried out overlapping the previously composited edge so as to achieve softstroking of said at least one component.

17. The apparatus as claimed in claim 16 wherein for said repeating means, the opacity value is higher than the immediately preceding opacity value.

18. The apparatus as claimed in claim 16 wherein for the repeating means, the opacity value is lower than the immediately preceding opacity value.

19. A method of performing a process of making a plurality of areas of an image in the vicinity of at least one edge having an opacity value and a thickness value and rendering each of the areas in a manner slightly different from another, said method comprising the steps of:

compositing or rendering the at least one edge with a corresponding thickness value and a corresponding opacity value; and repeating said compositing or rendering at least once with a thickness value and a corresponding value each different from a proceeding corresponding thickness value nd opacity value, wherein the repeated compositing or rendering is carried out by overlapping the previously rendered or composite edge so as to achieve the compositing or rendering of each of the areas in a slightly different manner.

20. A method of creating an image in which at least one component includes at least one edge, said method comprising the steps of:

compositing or rendering a portion of the component, said portion having associated therewith a thickness value and an opacity value;

repeating said compositing or rendering step at least once with thickness and opacity values different from preceding thickness and opacity values, wherein said repeated compositing or rendering is carried out by overlapping the previously rendered or composited portion whereby a plurality of areas in a vicinity of the edge are formed having an opacity slightly different from one another.

21. A method as claimed in claim 20 wherein the thickness value has a range from a first, wide value, to a second, narrow value, and the corresponding opacity value has a range from a first, low value, to a second, high value.

22. A method as claims in claim 20 wherein the thickness value has a range from a first, wide value, to a second, narrow value, and the corresponding opacity value has a range from a first, high value, to a second, low value.

23. A method as claimed in claim 20 wherein a center of said edge corresponds with a narrow thickness value.

24. A method as claimed in claim 20 wherein said opacity value is rendered to an opacity plane of said image.

25. A method as claimed in claim 20 wherein said opacity value is composited onto an opacity plane of said image.

26. An apparatus for creating an image in which at least one component includes at least one edge, said apparatus comprising:

means for compositing or rendering a portion of the component, said portion having associated therewith a thickness value and an opacity value;

means for repeating said compositing or rendering step at least once with thickness and opacity values different from preceding thickness and opacity values, wherein said repeated compositing or rendering is carried out by overlapping the previously rendered or composited portion whereby a plurality of areas in a vicinity of the edge are formed having an opacity slightly different from one another.

27. An apparatus as claimed in claim 26 wherein the thickness value has a range from a first, wide value, to a second, narrow value, and the corresponding opacity value has a range from a first, low value, to a second, high value.

28. An apparatus as claimed in claim 26 wherein the thickness value has a range from a first, wide value, to a second, narrow value, and the corresponding opacity value has a range from a first, high value to a second, low value.

29. An apparatus as claimed in claim 26 wherein a center of said edge corresponds with a narrow thickness value.

30. An apparatus as claimed in claim 26 wherein said opacity value is rendered to an opacity plane of said image.

31. An apparatus as claimed in claim 26 wherein said opacity value is composited onto an opacity plane of said image.

* * * * *

UNITED STATES PATENT AND TRADEMARK OFFICE
CERTIFICATE OF CORRECTION

PATENT NO. : 5,977,981

DATED : November 2, 1999

INVENTOR(S) : CRAIG MATTHEW BROWN

It is certified that error appears in the above-identified patent and that said Letters Patent is hereby corrected as shown below:

COLUMN 1

Line 7, "the" should be deleted;
Line 16, "his" should read --their--;
Line 20, "up," should read --up--.

COLUMN 2

Line 27, "comer" should read --corner--;
Line 29, "described" should read --describe;
Line 50, "method of method" should read --method--; and "images" should read --image--.

COLUMN 3

Line 8, "square.;" should read --square;--
Line 11, "invention.;" should read --invention;--;
Line 13, "square.;" should read --square;--;
Line 16, "posite onto.;" should read --posite;--;
Line 17, "method.;" should read --method;--;
Line 19, "pattern.;" should read --pattern;--;
Line 21, "methods.;" should read --methods;--;
Line 23, "methods.;" should read --methods;--;
Line 25, "construction" should read --construction--.

COLUMN 4

Line 17, "image," should read --image.--;
Line 26, "filly" should read --fully--;
Line 37, "25%." should read --25%,--;
Line 58, "destination 0.5" should read --destination=0.5--;
Line 62, "comrpositing" should read --compositing--;
Line 66, "and" should read --at--.

UNITED STATES PATENT AND TRADEMARK OFFICE
CERTIFICATE OF CORRECTION

PATENT NO.   : 5,977,981
DATED        : November 2, 1999
INVENTOR(S)  : CRAIG MATTHEW BROWN It is certified that error appears in the above-identified patent and that said Letters Patent is hereby corrected as shown below:

COLUMN 5

Line 5, "soft stroking" should read --softstroking--.

COLUMN 6

Line 9, "Soft stroking" should read --Softstroking--; and
   Line 64, "value,s aid" should read --value, said--.

COLUMN 8

Line 4, "nd" should read --and--;
   Line 13, "value;" should read --value; and--; and
   Line 42, "value;" should read --value; and--.

Signed and Sealed this

First Day of May, 2001

Attest:

NICHOLAS P. GODICI

*Attesting Officer*   *Acting Director of the United States Patent and Trademark Office*